US009661596B2

(12) United States Patent
Gupta

(10) Patent No.: US 9,661,596 B2
(45) Date of Patent: *May 23, 2017

(54) OVERSAMPLING DIGITAL RECEIVER FOR RADIO-FREQUENCY SIGNALS

(71) Applicant: Hypres Inc., Elmsford, NY (US)

(72) Inventor: Deepnarayan Gupta, Hawthorne, NY (US)

(73) Assignee: Hypres, Inc., Elmsford, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/449,643

(22) Filed: Aug. 1, 2014

(65) Prior Publication Data

US 2015/0078290 A1 Mar. 19, 2015

Related U.S. Application Data

(63) Continuation of application No. 13/911,288, filed on Jun. 6, 2013, now Pat. No. 8,811,536.

(51) Int. Cl.
*H04W 4/00* (2009.01)
*H04W 56/00* (2009.01)
(Continued)

(52) U.S. Cl.
CPC ........ *H04W 56/0015* (2013.01); *H04B 1/005* (2013.01); *H04B 1/0483* (2013.01); *H04B 1/40* (2013.01)

(58) Field of Classification Search
CPC ................................................ H04W 56/0015
(Continued)

(56) References Cited

U.S. PATENT DOCUMENTS 4,506,172 A 3/1985 Hasuo
4,943,985 A 7/1990 Gherardi
(Continued)

OTHER PUBLICATIONS

Hashimoto, et al., "Implementation of a 4X4 Switch with Passive Interconnects", IEEE Trans. Appl. Supercon., vol. 15, No. 2, Jun. 2005, pp. 356-359.
(Continued)

*Primary Examiner* — Samina Choudhry
(74) *Attorney, Agent, or Firm* — Steven M. Hoffberg, Esq.; Ostrolenk Faber LLP

(57) ABSTRACT

A system and method for receiving a radio frequency signal, comprising a device for digitizing, without prior alteration of frequency, an analog radio frequency representation of each of a plurality of radio frequency signals to produce a respective plurality of digital radio frequency signals having a respective associated radio frequency digital clock, the plurality of digital radio frequency signals having a sufficiently high respective associated clock rate to preserve an information content of an information communication present in the analog radio frequency representation; a switch matrix adapted to concurrently switch the plurality of digital radio frequency signals and associated digital radio frequency clock to ones of a plurality of digital signal processors; and a control adapted to selectively automatically control the concurrent switching of a plurality of digital signals and associated digital clock to the respective plurality of digital signal processors; wherein the digital signal processors produce processed representations of information contained in respective analog radio frequency representations.

19 Claims, 12 Drawing Sheets

(51) Int. Cl.
*H04B 1/00* (2006.01)
*H04B 1/04* (2006.01)
*H04B 1/40* (2015.01)

(58) Field of Classification Search
USPC .......................................................... 370/329
See application file for complete search history.

(56) References Cited

U.S. PATENT DOCUMENTS

| | | | |
|---|---|---|---|
| 5,140,324 A | 8/1992 | Przybysz et al. | |
| 5,225,712 A | 7/1993 | Erdman | |
| 5,289,400 A | 2/1994 | Przybysz et al. | |
| 5,323,390 A | 6/1994 | Pawelski | |
| 5,583,507 A | 12/1996 | D'Isepo et al. | |
| 5,818,373 A | 10/1998 | Semenov et al. | |
| 5,946,343 A | 8/1999 | Schotz et al. | |
| 5,963,351 A | 10/1999 | Kaplounenko et al. | |
| 6,005,446 A | 12/1999 | Galani et al. | |
| 6,154,044 A | 11/2000 | Herr | |
| 6,331,805 B1 | 12/2001 | Gupta et al. | |
| 6,724,216 B2 | 4/2004 | Suzuki et al. | |
| 6,734,699 B1 | 5/2004 | Herr et al. | |
| 6,759,974 B1 | 7/2004 | Herr | |
| 6,791,344 B2 | 9/2004 | Cook et al. | |
| 6,836,141 B2 | 12/2004 | Herr | |
| 6,836,154 B2 | 12/2004 | Fredriksson | |
| 6,865,639 B2 | 3/2005 | Herr | |
| 6,917,537 B2 | 7/2005 | Bunyk | |
| 6,960,929 B2 | 11/2005 | Bedard | |
| 7,084,722 B2 | 8/2006 | Goyette | |
| 7,362,125 B2 | 4/2008 | Gupta et al. | |
| 7,400,148 B2 | 7/2008 | Adachi | |
| 7,443,719 B2 | 10/2008 | Kirichenko et al. | |
| 7,508,230 B2 | 3/2009 | Kirichenko | |
| 7,535,230 B2 | 5/2009 | Takagi | |
| 7,680,474 B2 | 3/2010 | Kirichenko et al. | |
| 7,816,814 B1 | 10/2010 | Hennessy et al. | |
| 7,876,869 B1 | 1/2011 | Gupta | |
| 7,906,229 B2 | 3/2011 | Goyal | |
| 7,956,640 B2 | 6/2011 | Gupta et al. | |
| 7,991,013 B2 | 8/2011 | Gupta et al. | |
| 8,045,660 B1 | 10/2011 | Gupta | |
| 8,130,880 B1 | 3/2012 | Gupta | |
| 8,178,221 B2 | 5/2012 | Goyal | |
| 8,260,143 B2 | 9/2012 | Gupta et al. | |
| 8,260,144 B2 | 9/2012 | Gupta et al. | |
| 8,260,145 B2 | 9/2012 | Gupta et al. | |
| 8,359,186 B2 | 1/2013 | Ganesan et al. | |
| 8,462,889 B2 | 6/2013 | Gupta | |
| 8,514,986 B2 | 8/2013 | Gupta | |
| 8,565,345 B2 | 10/2013 | Gupta | |
| 8,593,141 B1 | 11/2013 | Radparvar et al. | |
| 8,618,799 B1 | 12/2013 | Radparvar et al. | |
| 8,780,420 B1 | 7/2014 | Bluzer et al. | |
| 8,795,854 B2 | 8/2014 | Goyal | |
| 8,811,536 B2 | 8/2014 | Gupta | |
| 8,867,931 B2 | 10/2014 | Gupta et al. | |
| 8,922,063 B2 | 12/2014 | Taddeo | |
| 8,987,736 B2 | 3/2015 | Goyal | |
| 9,020,079 B2 | 4/2015 | Gupta | |
| 9,020,362 B2 | 4/2015 | Gupta et al. | |
| 9,029,750 B1 | 5/2015 | Bluzer | |
| 9,225,920 B2 | 12/2015 | Bluzer | |
| 9,244,142 B2 | 1/2016 | Feiweier et al. | |
| 2002/0012138 A1 | 1/2002 | Graves et al. | |
| 2002/0084795 A1 | 7/2002 | Cook et al. | |
| 2003/0218553 A1* | 11/2003 | Azinger | H03M 7/30 341/61 |
| 2004/0022332 A1 | 2/2004 | Gupta et al. | |
| 2004/0033627 A1 | 2/2004 | Aytur et al. | |
| 2004/0120299 A1 | 6/2004 | Kidiyarova-Shevchenko et al. | |
| 2005/0035368 A1 | 2/2005 | Bunyk | |
| 2005/0080975 A1 | 4/2005 | Elledge et al. | |
| 2005/0235027 A1 | 10/2005 | Jung et al. | |
| 2005/0243708 A1 | 11/2005 | Bunyk | |
| 2006/0038710 A1 | 2/2006 | Staszewski et al. | |
| 2006/0179277 A1 | 8/2006 | Flachs et al. | |
| 2006/0214662 A1 | 9/2006 | Adachi | |
| 2006/0291589 A1 | 12/2006 | Eliezer et al. | |
| 2007/0293160 A1 | 12/2007 | Gupta et al. | |
| 2008/0101444 A1 | 5/2008 | Gupta et al. | |
| 2008/0101501 A1 | 5/2008 | Gupta | |
| 2008/0101503 A1 | 5/2008 | Gupta | |
| 2008/0107213 A1 | 5/2008 | Gupta et al. | |
| 2008/0119230 A1 | 5/2008 | Guda et al. | |
| 2008/0120676 A1* | 5/2008 | Morad | H04N 21/42607 725/127 |
| 2008/0217622 A1 | 9/2008 | Goyal | |
| 2008/0218168 A1 | 9/2008 | Takagi | |
| 2008/0230779 A1 | 9/2008 | Goyal | |
| 2008/0265255 A1 | 10/2008 | Goyal | |
| 2009/0232191 A1 | 9/2009 | Gupta et al. | |
| 2009/0232507 A1 | 9/2009 | Gupta et al. | |
| 2009/0232510 A1 | 9/2009 | Gupta et al. | |
| 2011/0062446 A1 | 3/2011 | Goyal | |
| 2011/0288823 A1 | 11/2011 | Gupta | |
| 2012/0274145 A1 | 11/2012 | Taddeo | |
| 2012/0328301 A1 | 12/2012 | Gupta et al. | |
| 2013/0004180 A1 | 1/2013 | Gupta et al. | |
| 2013/0127462 A1 | 5/2013 | Feiweier et al. | |
| 2013/0134978 A1 | 5/2013 | Biber | |
| 2013/0272453 A1 | 10/2013 | Gupta | |
| 2014/0267852 A1 | 9/2014 | Bluzer | |
| 2014/0286465 A1 | 9/2014 | Gupta | |
| 2015/0078290 A1 | 3/2015 | Gupta | |
| 2015/0125155 A1 | 5/2015 | Gupta et al. | |
| 2015/0229343 A1 | 8/2015 | Gupta | |

OTHER PUBLICATIONS

Brock, et al., "Superconductor Digital Development for Software Radio", IEEE Commun, Mag., pp. 174-179, Feb. 2001.
Likharev, et al., "RSFQ Logic/MemoryFamily: A new Josephson junction technology for sub-THz digital systems", IEEE Trans. Appl. Supercond., vol. 1, pp. 3-28, 1991.
Kirichenko et al. "4-bit Rapid Single-Flux-Quantum Decoder," Jun. 1995, IEEE Transactions on Applied Superconductivity, vol. 5, No. 2, pp. 2857-2860.
Polonsky et al. "New RSFQ Circuits," Mar. 1993, IEEE Transactions on Applied Superconductivity, vol. 3, No. 1, pp. 2566-2577.
Filippov et al. "Look-Up Table for Superconductor Digital-RF Predistorter," Jun. 2007, IEEE Transactions on Applied Superconductivity, vol. 17, No. 2, pp. 561-564.
Bunyk et al., RFSQ Microprocessor: New Design Approaches, IEEE Transactions on Applied Superconductivity, vol. 7, No. 2, Jun. 1997, pp. 2697-2704.
K.K. Likharev and V.K. Semenov, RSFQ Logic/Memory Family: A new Josephson-Junction Technology for Sub-Terahertz-Clock-Frequency Digital Systems, IEEE, vol. 1, No. 1, Mar. 1991, pp. 9-18.
S. Polonski, V. Semenov and A. Kirichenko, Single Flux, Quantum B Flip-Flop and Its Possible Applications, IEEE, vol. 4, No. 1, Mar. 1994, pp. 9.
A- Shevchenko, A. Kiritchenko, S. Polonsky and P. Shevchenko, New Elements of the RSFQ Logic/Memory Family Part 2), Department of Physics, Moscow State University, Moscow, 4 pages, no date.
A- Kirichenko and V. Semenov, 4-bit Rapid Single-Flux-Quantum Decoder, IEEE, vol. 5, No. 2, Mar. 1995, pp. 2857-2860.
A. Kirichenko, S. Sarwana, D. Gupta and D. Yohannes, Superconductor Digital Receiver Components, IEEE, vol. 15, No. 2, Jun. 2005, pp. 249-254.
L. Fei, Frequency Divider Design Strategies, Broadband Technology, Mar. 2005, pp. 18-26.
B. Gilbert, "A Precise Four Quadrant Multiplexer With Subnanosecond Response," IEEE, vol. SC-3, pp. 365-373, Dec. 1968.
Anna Yu. Kidiyarova-Shevchenko, Konstantin Yu. Platov, Elena M. Tolkacheva, and Irina A. Kataeva; "RSFQ Asynchronous Serial

(56) References Cited

OTHER PUBLICATIONS

Multiplier and Spreading Codes Generator for Multiuser Detector", IEEE Transactions on Applied Superconductivity, vol. 13, No. 2, Jun. 2003.

* cited by examiner

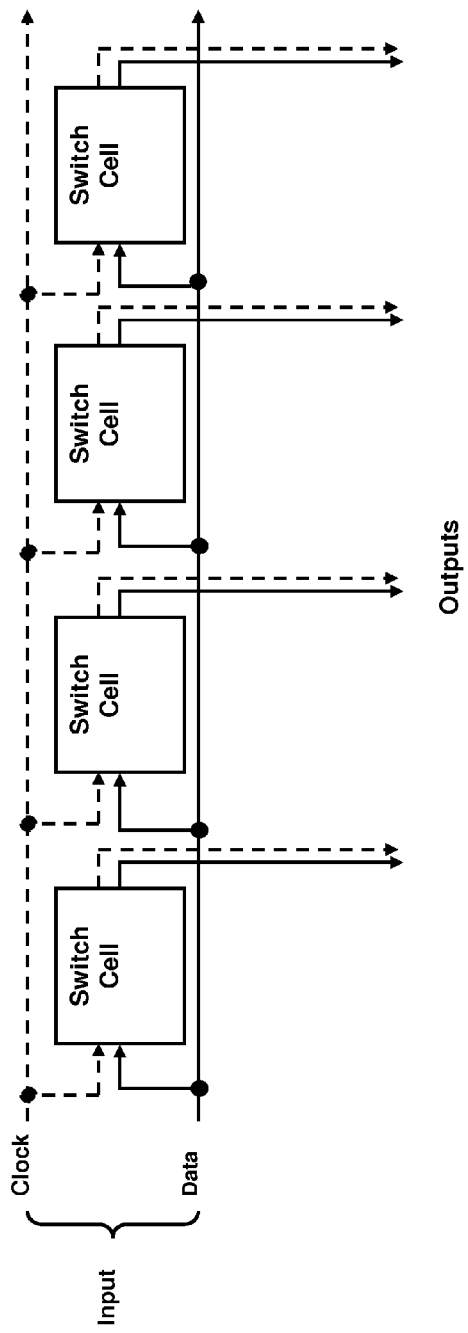
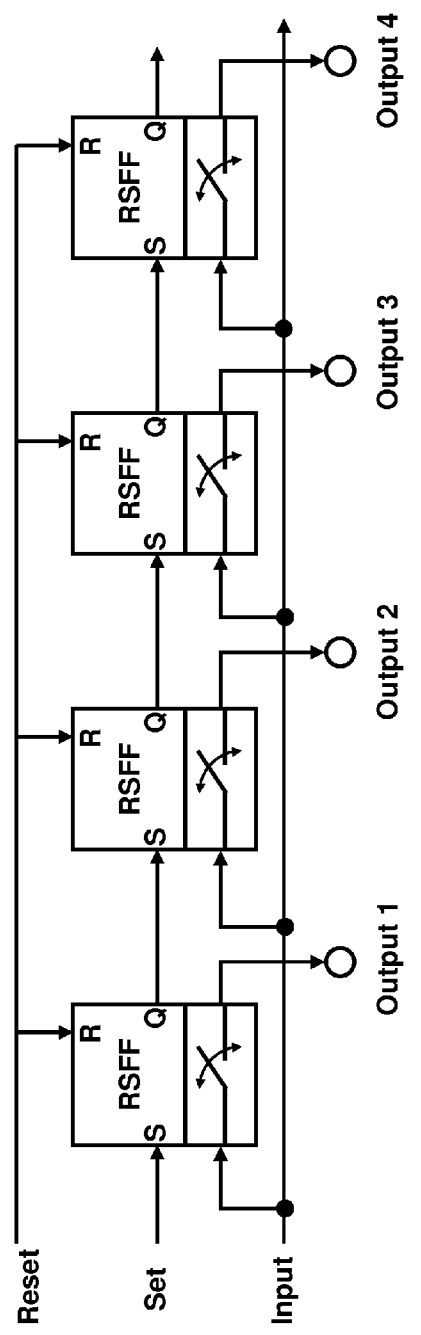
Fig. 9A
Fig. 9B

OVERSAMPLING DIGITAL RECEIVER FOR RADIO-FREQUENCY SIGNALS

CROSS REFERENCE TO RELATED APPLICATIONS

This application is a Continuation of U.S. patent application Ser. No. 13/911,288, filed Jun. 6, 2013, now U.S. Pat. No. 8,811,536, issued Aug. 19, 2014, which is a Continuation of U.S. patent application Ser. No. 11/966,897, filed Dec. 28, 2007, now U.S. Pat. No. 8,462,889, issued Jun. 11, 2013, and is a Continuation of U.S. patent application Ser. No. 11/966,906, filed Dec. 28, 2007, now U.S. Pat. No. 8,565,345, issued Oct. 22, 2013, which are each Continuations-in-Part of U.S. patent application Ser. No. 11/243,019, filed Oct. 4, 2005, now U.S. Pat. No. 7,680,474, issued Mar. 16, 2010; and U.S. patent application Ser. No. 11/243,020, filed Oct. 4, 2005, now U.S. Pat. No. 7,508,230, issued Mar. 24, 2009; and U.S. patent application Ser. No. 11/243,022, filed Oct. 4, 2005, now Abandoned; and U.S. patent application Ser. No. 11/424,121, filed Jun. 14, 2006, now U.S. Pat. No. 7,362,125, issued Apr. 22, 2008; and U.S. patent application Ser. No. 11/360,749, filed Feb. 23, 2006, now U.S. Pat. No. 7,443,719, issued Oct. 28, 2008, each of which is expressly incorporated herein by reference in its entirety.

BACKGROUND OF THE INVENTION

Field of the Invention

This technology relates to the field of switching circuits and, more particularly, for switching circuits for advanced digital radio receivers and transmitters.

Description of the Prior Art

A simple classic radio receiver consists of a single antenna coupled to a downconverter that extracts a single "baseband" channel. In a modern receiver, the baseband signal is digitized with an analog-to-digital converter (ADC) and further processed in the digital domain. A classic transmitter contains essentially the same components working in the reverse direction; a transceiver contains both a transmitter and a receiver packaged together.

A multi-band, multi-channel RF communications system (see FIG. 1a) can include multiple antennas, and can extract multiple baseband channels or groups of channels simultaneously. This requires a switch matrix, which permits distribution of various signals between each antenna (corresponding to each band) and one or more appropriate radio receiver channels. If the system is to be flexible and reconfigurable, it should be possible to redirect input signals to selected output channels.

The signal at the antenna is an analog waveform, even if it may be encoding a digital signal. In a conventional receiver system of the prior art, as illustrated in FIG. 1a, both the switch matrix and the channelizing receivers are analog components, and similarly for the transmitter. However, these band-specific precision analog components are often expensive and limited in their flexibility and reconfigurability. Furthermore, these analog switching systems have severe deficiencies in terms of losses, isolation, crosstalk, and ability to multicast.

For these reasons, the communications industry would like to move toward an approach known as "software-defined radio" (SDR) or "software radio", where all data processing is carried out in the digital domain, except right at the antenna itself. This requires ultrafast data converters, with sampling rates of tens of GHz and excellent linearity. ADCs with the requisite properties have recently been demonstrated, based on superconductor electronics using Josephson junctions, with circuit designs based on rapid-single-flux-quantum logic (RSFQ). It is natural that this data conversion be carried out right at the antenna, as illustrated in FIG. 1b. But in this case, the switching must also be carried out directly on the digital-RF signals. Furthermore, the precision and linearity of these signals can be maintained in the distribution network only if the sampling clock is distributed along with the data bits. This requires a new type of digital-RF switch matrix, which has not been reported before.

Furthermore, the digital-RF transceiver architecture allows natural partitioning between band-specific (analog) and band-independent (digital) components. Analog components, such as antennas and amplifiers are optimized for performance within a particular frequency band. Even data converters between analog and digital formats, ADCs and DACs, work best with designs that target specific frequency bands. Furthermore, an ADC or DAC optimized for a particular frequency band will typically have a particular sampling frequency (clock frequency $f_{clock}$) that is preferred for best performance. For example, a radio-frequency bandpass ADC designed for a center frequency f) may exhibit the greatest dynamic range for a sampling frequency that is four times the center frequency ($f_{clock}=4\times f$)). On the contrary, digital signal processing units, operating on numbers, are independent of the signal characteristics. This partitioning enables the true software radio paradigm by allowing full software programmability of the RF distribution network. Superconductor electronics are fast enough to digitize at multi-GHz RF and perform subsequent processing completely in the digital domain.

Switch matrices based on superconducting electronic circuits have been recently reported by several inventors. For example, see (1) U.S. Pat. No. 6,960,929, issued Nov. 1, 2005 by inventor Fernand D. Bedard, entitled Superconductive Crossbar Switch, (2) U.S. Pat. No. 6,917,537, issued Jul. 12, 2005 by inventor Paul I. Bunyk entitled RSFQ Batcher-Banyan Switching Network, (3) U.S. Pat. No. 6,865,639, issued Mar. 8, 2005 by inventor Quentin P. Herr entitled Scalable Self-Routing Superconductor Switch, and (4) Hashimoto et al., Implementation of a 4×4 Switch With Passive Interconnects, IEEE Trans. Appl. Supercon., vol 15, no. 2, June 2005, pp. 356-359.

However, none of these patents was designed for an application in RF communications, and none of these include switches which route the clock signal together with the data signal. See also the article by D. K. Brock, O. A. Mukhanov, and J. Rosa, "Superconductor Digital Development for Software Radio," IEEE Commun. Mag., pp. 174-179, February 2001, and K. K. Likharev and V. K. Semenov, "RSFQ Logic/Memory Family: A new Josephson junction technology for sub-THz digital systems", IEEE Trans. Appl. Supercond., vol. 1, pp. 3-28, 1991.

Problems of the Prior Art

The prior art switches have been expensive and limited in their flexibility and ability to reconfigure. In addition, they have severe deficiencies in terms of losses, isolation, cross talk and ability to multicast.

It is natural and desirable that data conversion be carried out right at the antenna, but, in such a case, the switching must also be carried out directly on the digital-RF signals. Further, the precision and linearity of these signals can be maintained in the distribution network only if the sampling clock is distributed along with the data bits. This requires and new type of digital-RF switch matrix.

SUMMARY AND OBJECTS OF THE INVENTION

A multi-carrier, multi-channel RF communication system requires a switch matrix to route various signals between a set of antennas and a set of radio transceivers. This can be carried out most efficiently in the digital domain, but requires the use of ultrafast circuits that can accurately process multi-GHz RF signals.

One aspect of the technology is directed to a switch matrix which is suitable for routing various signals between a set of antennas and a set of radio transceivers. The transceivers can be multi-carrier, multi-channel RF communication devices. The routing is carried out in the digital domain and uses ultra fast superconductive circuits that can accurately process multi-gigahertz RF signals. For best performance the basic switching cell must carry both the data bits and the sampling clock, where the sampling clock may be at different frequencies for signals from different RF bands distributed within the same switch matrix.

Preferred exemplary embodiments are implemented using ultra fast RSFQ superconducting logic elements.

It is therefore an object to provide a method for receiving a radio frequency signal, comprising digitizing, without prior alteration of frequency, an analog radio frequency representation of each of a plurality of radio frequency signals to produce a respective plurality of digital radio frequency signals having a respective associated radio frequency digital clock, the plurality of digital radio frequency signals having a sufficiently high respective associated clock rate to preserve an information content of an information communication present in the analog radio frequency representation; concurrently switching the plurality of digital radio frequency signals and associated digital radio frequency clock to ones of a plurality of digital signal processors; selectively automatically controlling the concurrent switching of a plurality of digital signals and associated digital clock to the respective plurality of digital signal processors; and producing, by the digital signal processors, processed representations of information contained in respective analog radio frequency representations.

The associated radio frequency clock for at least two of the respective digital radio frequency signals may be independent of each other.

At least one associated radio frequency digital clock may have a clock rate above a Nyquist rate for a radio frequency carrier of the analog radio frequency representation. Thus, the analog to digital converter may operate at frequencies in excess of 350 mega-samples per second, and, for example, at frequencies of 1, 5, 10, 20, 40 or even 100 giga-samples per second, with corresponding clock frequencies of 1, 5, 10, 20, 40, 100 GHz, or higher. Typically, the preferred oversampling range is at least 4 times the highest substantial-power frequency component in the band to be subsequently analyzed. Because there is no particular requirement for down-conversion or frequency translation of the signals, the band may be a "baseband" signal, that is, one in which energy components extend to DC or near 0 Hertz. Practically, a received radio frequency signal will not have such low frequencies, but in some cases may include signals in the kilohertz or higher range. Each analog signal coupler may therefore be adapted to couple a radio frequency signal within a band, the band having an upper range limit, the associated clock for the respective analog to digital converter operating above a Nyquist rate for the upper range limit.

As is known, if the frequency of a signal component having significant power exceeds the Nyquist rate, which is considered double the highest frequency, then there will be aliasing of the signal onto lower frequency components. While this is generally undesirable, in some cases, it is acceptable, especially where the signal has a frequency above the capabilities of the process, it has modulated information that can be extracted from the aliased signal, and when aliased, it does not interfere with reception of a signal of interest. Each analog signal coupler may therefore be adapted to couple a radio frequency signal within a band, the radio frequency signal comprising an information signal, the associated clock for the respective analog to digital converter operating above a minimum rate required to capture and digitally represent the information signal from the radio frequency signal.

At least two digital signal processors may be concurrently switched to process a respective digital radio frequency signal.

At least one of the respective digital radio frequency signals may comprises a parallel multiple binary bit digital representation of the representation of the analog radio frequency representation. At least one of the respective analog to digital converters may generate a parallel multiple binary bit digital representation of the representation of the radio frequency signal, the parallel multiple binary bit digital representation and associated clock being routed by the non-blocking switch matrix to at least one digital radio frequency signal processor. The multiple binary bit analog-to-digital converter may be, for example, a single bit delta-sigma architecture converter, which is processed to produce a multi-bit output, or an intrinsically multibit converter. Of course, a single bit converter and signal distribution architecture may also be employed.

A delay of a digital radio frequency signal and respective associated radio frequency digital clock may be matched to maintain synchronization. A delay of a digital radio frequency signal may be selectively controlled. At least two of the associated radio frequency digital clocks having different frequencies may be generated. A switching may occur to change an analog radio frequency representation routed to a digital signal processor dynamically in real time.

The plurality of analog radio frequency representations are received through respective separate antennas. At least two of the analog radio frequency representations may be in the same or different radio frequency bands, or in overlapping bands. If in the same or overlapping band, these signals may be, for example, subject to different digitization processing and/or analog or digital processing. Preferably, analog processing is minimized, to thereby eliminate sources of analog linear and non-linear distortion.

At least one digital signal processor may implement a digital channelizing receiver. A plurality of analog radio frequency representations within different radio frequency bands may be received through different antennas, and selectively concurrently switched to a plurality of channelizing receivers. At least one digital signal processor may comprise a channelizing receiver implementing at least one stage of digital down-conversion of a digital radio frequency signal from a frequency of the analog radio frequency representation to a lower frequency, while substantially retaining information modulated in the analog radio frequency representation. A plurality of information channels may be extracted from the digital radio frequency signals.

A digital radio frequency signal may be cross-correlated and/or autocorrelated at the clock rate.

It is also an object to provide a method for receiving signals, comprising generating digital data directly from a received radio frequency signal substantially without frequency translation, based on a digital data clock signal defined independently of the received signal and having a sufficiently high clock rate to preserve information modulated in the received radio frequency signal; and selectively directing a plurality of sets of digital data and an associated digital data clock, to a plurality of digital signal processors, each accepting the generated digital data at the high clock rate. The selectively directing may be non-blocking and multicasting.

An analog delay associated with a set of digital data and associated digital data clock may be independently tuned with respect to other sets of digital data and respective associated clocks.

It is a further object to provide a receiver adapted to receive radio frequency signals, comprising a plurality of digitizers, each adapted to digitize an analog radio frequency representation of each of a plurality of radio frequency signals, without prior alteration of frequency, to produce a respective plurality of digital radio frequency signals having a respective associated radio frequency digital clock, the plurality of digital radio frequency signals having a sufficiently high respective associated clock rate to preserve an information content of an information communication present in the analog radio frequency representation; and a switch matrix adapted to concurrently selectively switch, based on an automated control signal, the plurality of digital radio frequency signals and the associated plurality of digital radio frequency clocks to a plurality of digital signal processors adapted to process representations of information contained in respective analog radio frequency representations.

The associated radio frequency clock for at least two of the respective digital radio frequency signals may be independent of each other and/or at different frequencies.

At least one associated radio frequency digital clock may have a clock rate above a Nyquist rate for a radio frequency carrier of the analog radio frequency representation. At least one associated clock rate may be in excess of 1 gigahertz.

At least two digital signal processors may be concurrently switched to process a respective digital radio frequency signal.

At least one of the respective digital radio frequency signals may comprise a parallel multiple binary bit digital representation of the representation of the analog radio frequency representation.

A delay matching element adapted to match a delay of a digital radio frequency signal and respective associated radio frequency digital clock to maintain synchronization may be provided.

The switch matrix may dynamically route an analog radio frequency representation to a digital signal processor in real time. That is, while the receiver is receiving a signal, and without substantially interrupting the reception and digital processing of the signal, a switching state of the switch matrix may be modified. For example, an agile signal may be present in different bands, and therefore be received through different antennas over time. The switch matrix may therefore switch the respective analog-to-digital converter feeding a signal to a respective digital signal processor in real time, to track the signal as it changes band, while maintaining a state of the digital signal processing chain. As necessary, a switching transient may be suppressed by a digital control signal, though this may not be necessary. On the other hand, a signal may change its modulation scheme, requiring a different types of processing, and therefore the signal from an analog-to-digital converter may be routed to different digital signal processors over time. Since there may be many different signals present in each band, and each signal may require a different types of processing, the system is preferably multicasting to permit multiple digital signal processors to receive the output of each analog-to-digital converter concurrently as may be required to process the signals present. Therefore, preferably, the digital signal processors are capable of handling signals over a wide range of sampling rates, to allow such dynamic reconfiguration. The plurality of analog radio frequency representations may therefore be received through respective separate antennas, and at least two of the analog radio frequency representations may be in different radio frequency bands.

At least one digital signal processor may implement a digital channelizing receiver. A plurality of analog radio frequency representations within different radio frequency bands may be received through different antennas, and selectively concurrently switched to a plurality of channelizing receivers. At least one digital signal processor comprises a channelizing receiver implementing at least one stage of digital down-conversion of a digital radio frequency signal from a frequency of the analog radio frequency representation to a lower frequency, while substantially retaining information modulated in the analog radio frequency representation. At least one digital signal processor extracts a plurality of information channels from a respective digital radio frequency signal.

At least one digital signal processor may be adapted to cross correlate and/or autocorrelate a digital radio frequency signal at the clock rate. In the case of a single bit analog converter whose output is converted to a multibit representation and the sample rate correspondingly reduced, the cross correlation and/or autocorrelation may occur at this reduced rate.

It is another object to provide a receiver for receiving signals, comprising a convertor adapted to generate digital data directly from a received radio frequency signal substantially without frequency translation, based on a digital data clock signal defined independently of the received signal and having a sufficiently high clock rate to preserve information modulated in the received radio frequency signal; and a switch matrix adapted to selectively direct a plurality of sets of digital data and an associated digital data clock, to a plurality of digital signal processors, each accepting the generated digital data at the high clock rate. The switch matrix may be non-blocking and multicasting, and, for example, may be implemented as a Banyan network constructed from low temperature superconducting elements, such as niobium-based Josephson Junctions, to implement RSFQ circuits. At least one tunable analog delay device may be provided adapted to tune an analog delay associated with a first set of digital data and associated first digital data clock independently of a delay associated with a second set of digital data and associated second digital data clock.

BRIEF DESCRIPTION OF THE DRAWINGS

FIGS. 9A and 9B show implementations of a multicasting switch using RSFQ cells, respectively with and without clock accompanying a data line.

DETAILED DESCRIPTION OF THE INVENTION

I. Basic Switching Cells

RSFQ logic, first developed by Likharev, Semenov, and Mukhanov, is built around Josephson junctions (JJs), with lossless propagation of single-flux-quantum (SFQ) voltage pulses, each corresponding to an integrated pulse of 2 mV-ps. Two different types of RSFQ switch cells are described, both of which are well known in the literature: the DC switch and the NDRO switch. In either case, the general principle of operation is the same. A JJ is biased such that an SFQ pulse will cause it to temporarily exceed its critical current and then return to its previous state, thus emitting another SFQ pulse. The switching time, which depends on the critical current density (Jc) of the JJ, is about 2 ps for the Jc=4.5 kA/cm$^2$. This ultrafast switching allows a very high rate (40 Gbps and higher) of SFQ digital signals. Whether or not a switch responds to an input SFQ pulse depends on its designed control conditions (DC bias, control current, or other concurrent digital events). For example, the state of the switch—whether it will pass or block a digital input—may be controlled by the state of a coupled flip-flop, where control information could be stored.

Figure 1A:
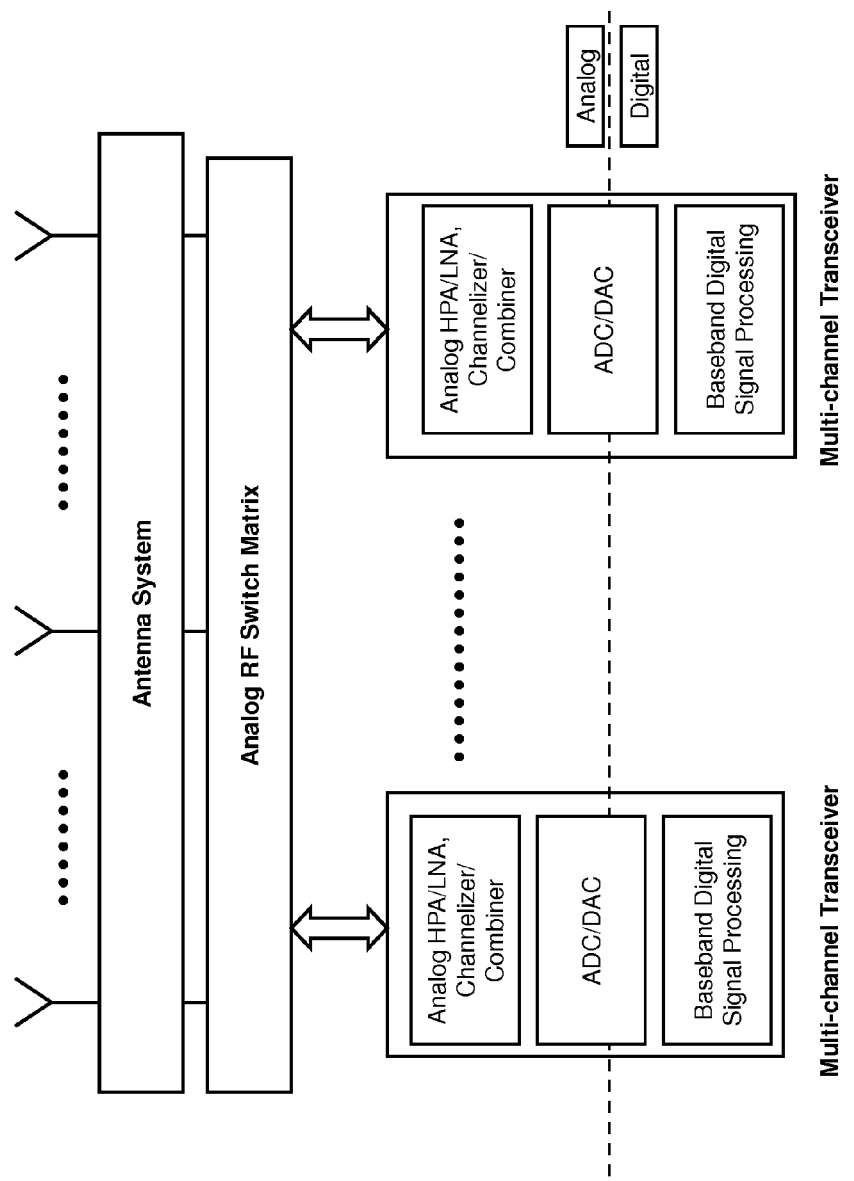
FIG. 1A is a block diagram of a multi-band, multi-channel RF transceiver system incorporating an analog switch matrix as known in the prior art.
Figure 1B:
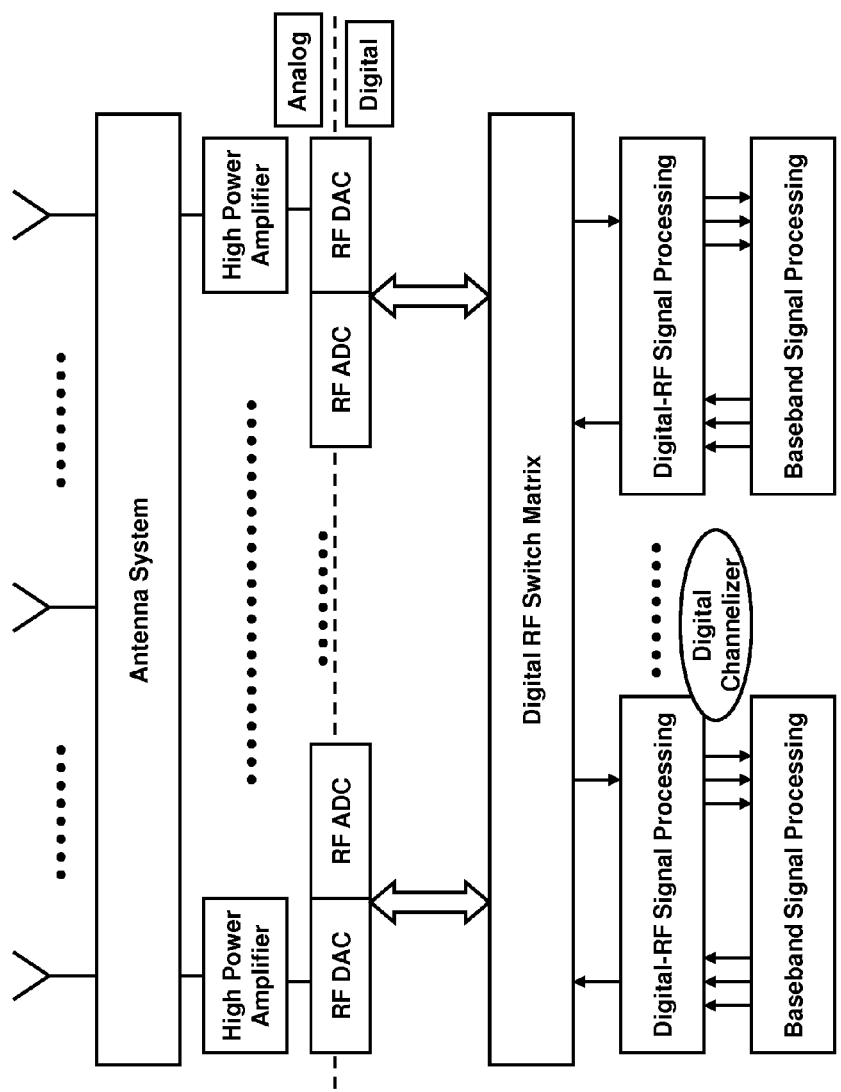
FIG. 1B is a block diagram of a multi-band, multi-channel RF transceiver system incorporating a new digital switch matrix for use with digital RF architectures.
Figure 2:
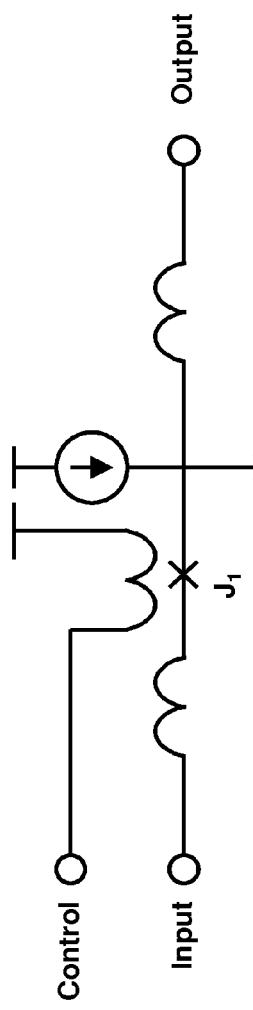
FIG. 2 shows a basic digital switch using Josephson junctions.

FIG. 2 shows a schematic diagram of a simple DC-switch with only 2 JJs, which is controlled by applying DC current to the control line.

Figure 3B:
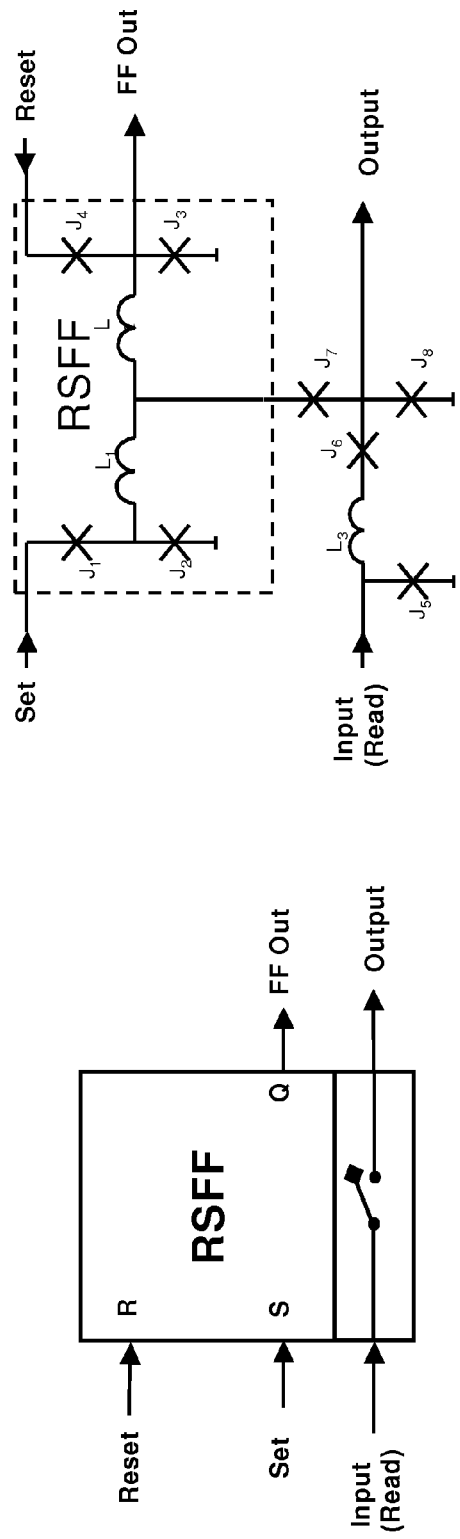
FIG. 3B is a schematic diagram of the digital switch based on a non-destructive readout (NDRO) cell.
Figure 3A:
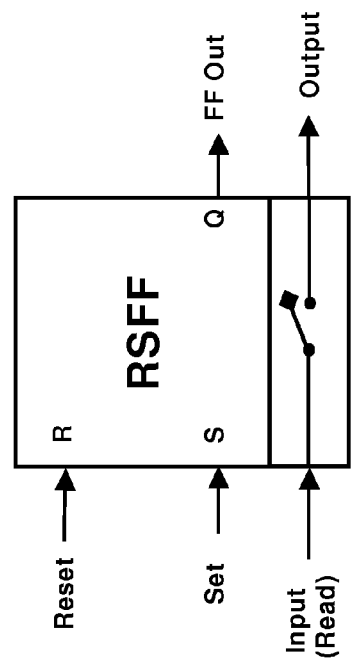
FIG. 3A is a block diagram of a digital switch based on a non-destructive readout (NDRO) cell.

FIGS. 3A and 3B show another digital switch element, called a non-destructive readout (NDRO) switch, where the control information is stored in a reset-set flip-flop (RSFF). (The NDRO switch with 8 JJs is more complex for a single switch, but is more easily scalable to large switch matrices.) An SFQ pulse applied to the Set input sets the RSFF to the '1' state. While it is in the '1' state, any pulse applied to the input will be read out as an SFQ pulse at the output synchronized to the clock input. This corresponds to the 'ON' (closed) state of the switch.

If a pulse is applied to the Reset input, the RSFF is reset to the '0' state. While it is in the '0' state, any pulse applied to the input will escape through J6 and no SFQ pulse will be produced at the output. This corresponds to the 'OFF' (open) state of the switch. One advantage of this type of switch is that only one external control line is required for each cell to write the desired switch states for the entire matrix. Thus the control for the entire matrix can be stored as a serial digital word. This is achieved by simply connecting the RSFFs of different switch cells as a shift register by applying the FF Out to the Set input of the next RSFF.

One needs to route both data and clock from each input source through the switch to desired output ports, for fully asynchronous operation. Of course, this can be accomplished by two switch cells which are manually set (reset) together. However a more elegant solution is part of one aspect of the technology by routing the clock signal through an NDRO switch and controlling propagation of the data stream through an RSFF (see FIG. 4 where the clock line is shown as a dashed line), thus reducing the JJ count necessary.

Figure 4:
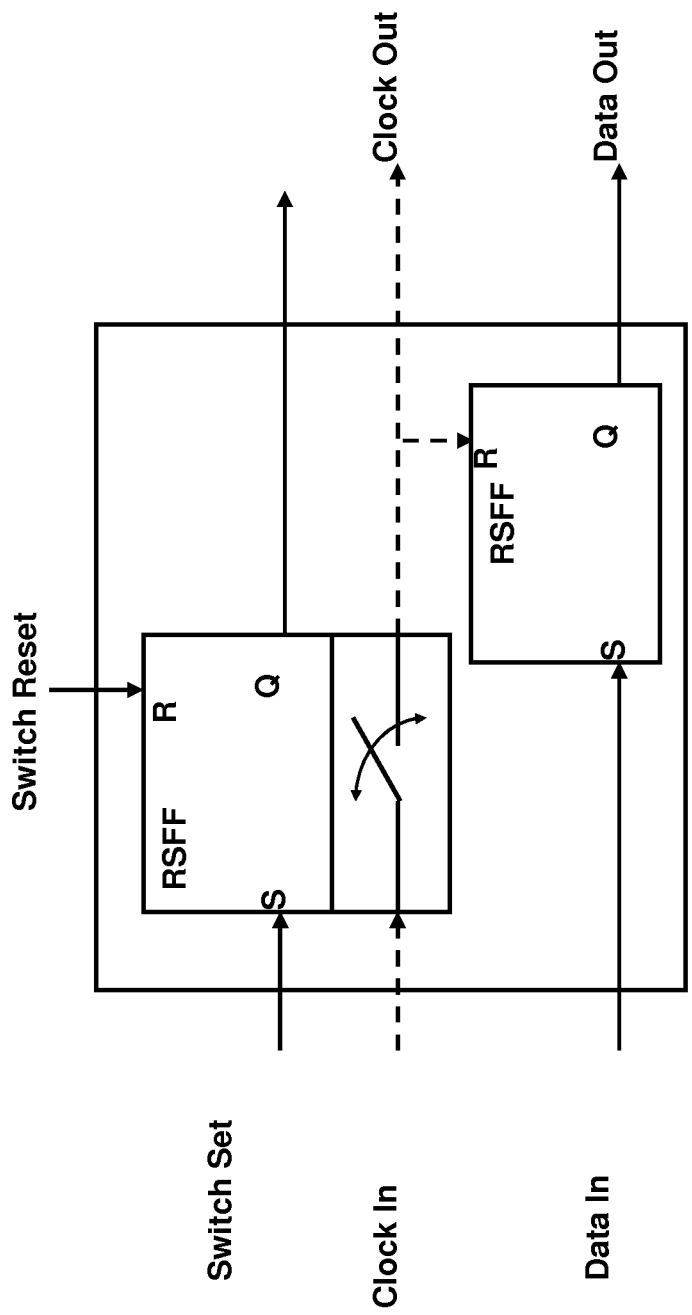
FIG. 4 is a novel switch cell for routing clock and data together.

FIG. 4 can be extended to accommodate a n-bit parallel data stream by replicating instances of the Data RSFF for each bit stream of the n-bit parallel data stream, with each RSFF being reset by the clock output signal.

II. Routing Switch Architecture

Figure 5:
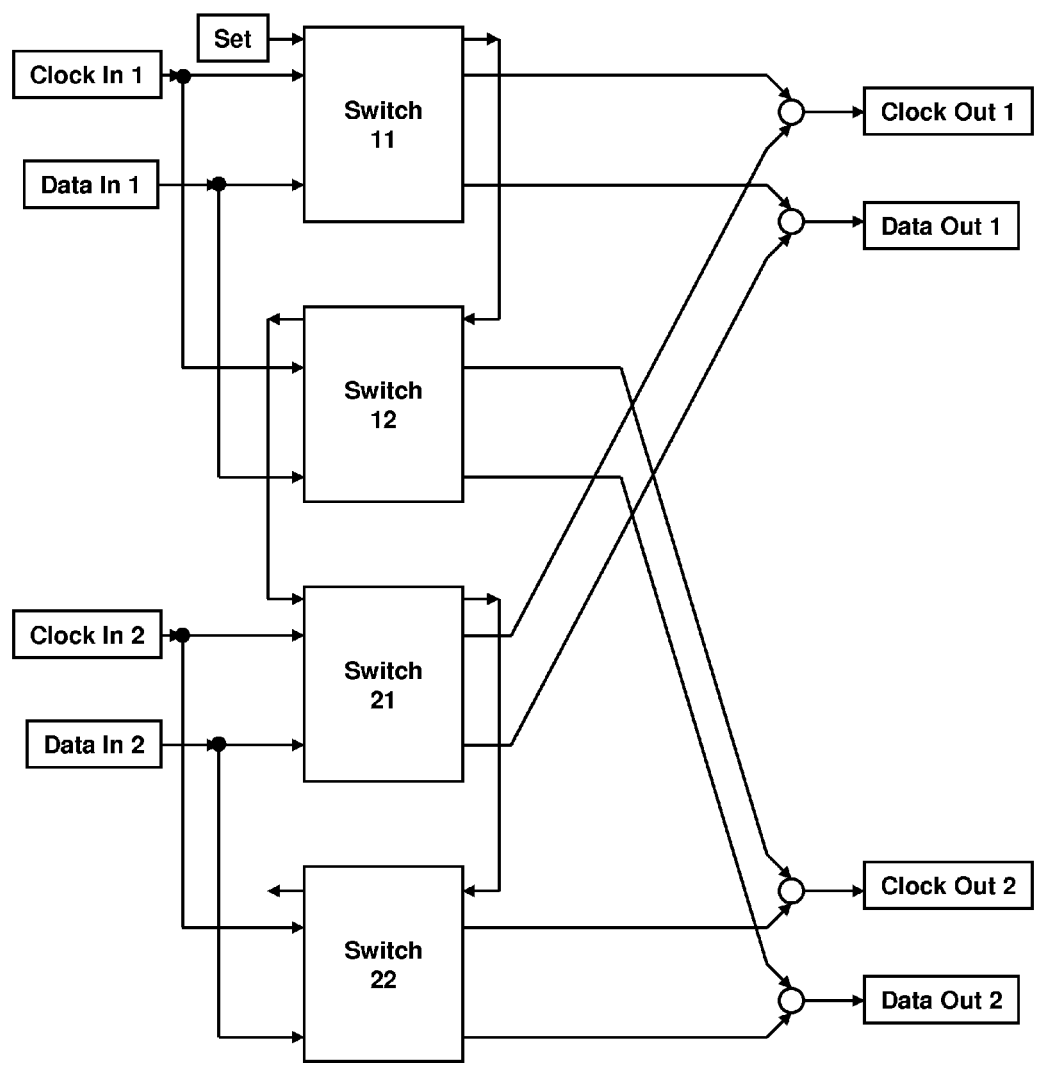
FIG. 5 is a block diagram of a 2×2 building-block for a 1:1 router matrix.

Consider a switch architecture where each input is routed only to a single output. (This constraint will be relaxed later.) To see how to scale up from a single switch, consider first a 2×2 building block (see FIG. 5). This is done with 4 switch cells. The data and clock signals from the first input are applied to Switch 11 and Switch 12 respectively, and the data and clock signals from the second input are applied to Switch 21 and Switch 22 respectively. The data and clock outputs from Switch 11 and Switch 21 are merged (combined) at the first output port, and the data and clock outputs from Switch 12 and Switch 22 are merged (combined) at the second output port. We have shown both clock and data paths, as well as the control (set) line, explicitly to illustrate the complexity of the design. We did not show the reset line, which will add to the routing complexity, but could be laid out similarly to the set lines in a way that should be obvious to one skilled in the art. Throughout the layout, maintaining accurate relative timing between paired clock and data signals is essential for correct operation.

Figure 6:
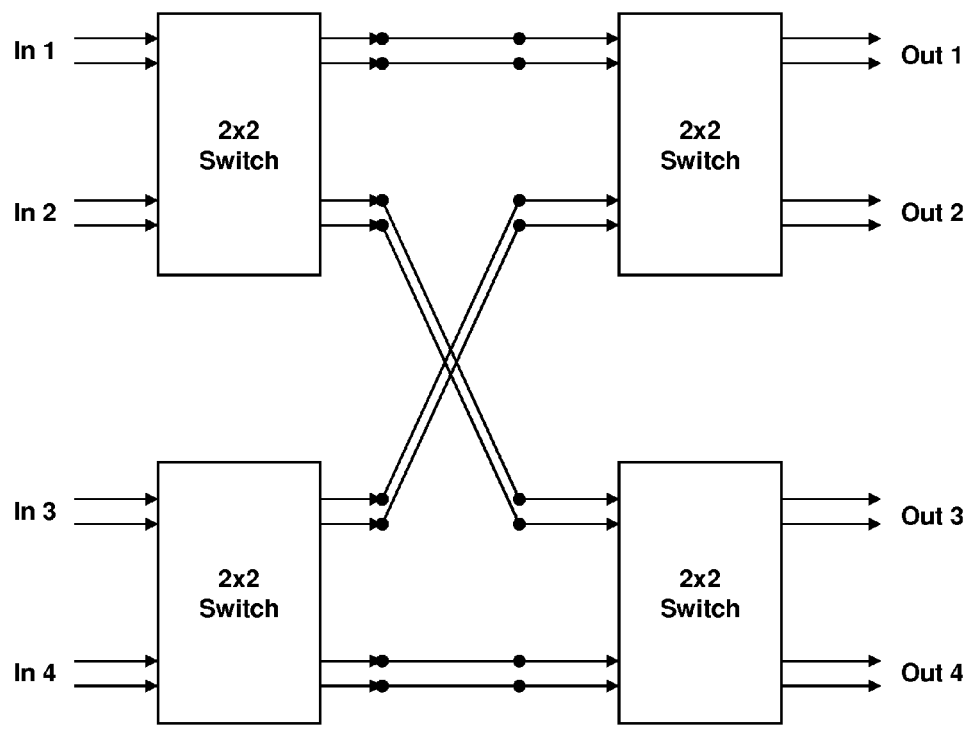
FIG. 6 is a block diagram of a 4×4 switch matrix consisting of four 2×2 building-blocks in a Banyan network.

Once a 2×2 switching network is complete, standard network approaches can be used to generate larger networks. For example, FIG. 6 shows the design of a 4×4 switch using the well-known, scalable Banyan network, with the double lines indicating routing of both data and clock signals together.

III. Architecture of Multicasting, Cross-Point Switch Matrix

Figure 7:
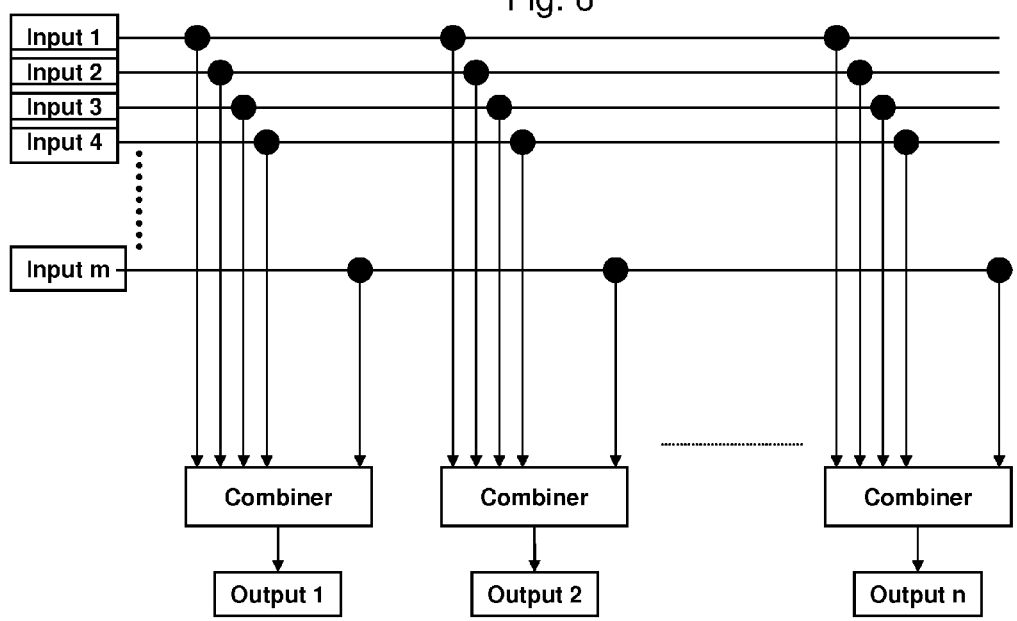
FIG. 7 shows a block diagram of a multicasting switch matrix.
Figure 8:
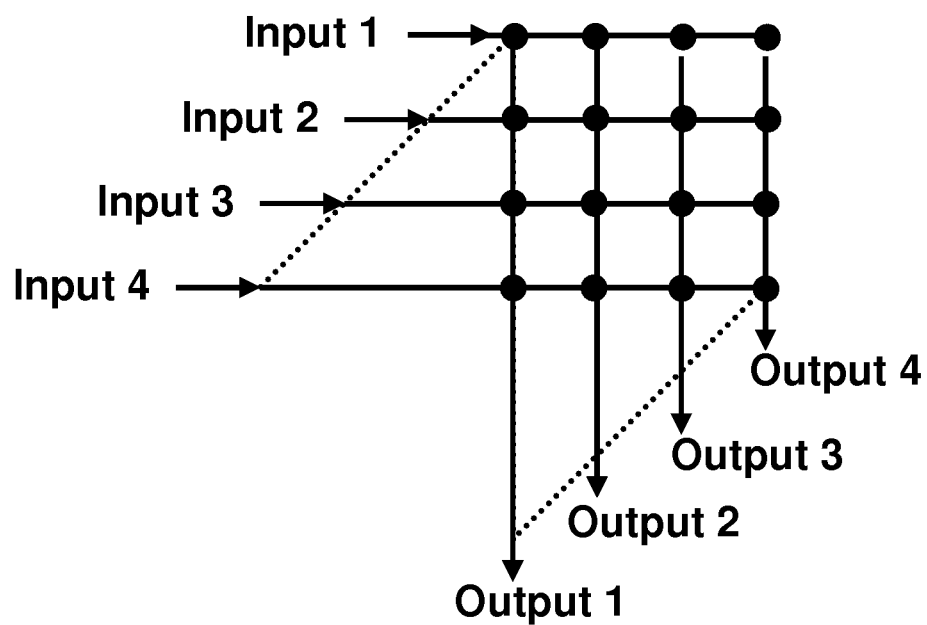
FIG. 8 shows an optional delay compensation network for a multicasting switch matrix of the type shown in FIG. 7.

For some applications, it is necessary to copy one input to multiple outputs, or vice versa. The relevant switch architecture here is an M×N cross-point switch matrix that connects M inputs to N outputs (FIG. 7). Here each input propagates horizontally through a set of switch cells. If a switch is turned on, a copy of the input data stream is routed down the corresponding column towards an output port; there is no degradation of signal quality since digital copying is lossless. Any number of switches may be turned on in each row to produce copies of the input at multiple output ports. There is a potential problem of latency in this structure, since the signal propagation paths from an input port to different output ports is different. For most communications applications, such small differences in propagation delays (a nanosecond or less) do not matter. Delay compensation networks (shown as triangles in FIG. 8) can be added for applications, such as a network switch for multiprocessor supercomputers, that are sensitive to delay mismatches. Delay compensation can be achieved using passive lines of matched physical lengths or active transmission structures with matching delay times (such as tunable Josephson transmission lines).

We can use the same DC and NDRO switches (FIGS. 2 and 3 or the switch cell of FIG. 4) to build this multicasting switch matrix depending on whether the clock line accompanies the data line. The building block of this matrix is a row (FIGS. 9A and 9B).

The multicasting switch matrix architecture in FIG. 7 is composed of M×N switches as in FIG. 3. Each switch has a set and reset line that permits the routing to be dynamically modified. For many implementations, as suggested in FIG. 9B, the "set" lines may be connected in series, and the entire M×N array addressed by a single digital word. Given the very fast clock speed, the entire array can be reconfigured in a short time. For very large arrays, partial parallel addressing (of separate rows, for example) may be used to speed up the reprogramming rate. In this way, one may direct any input to any and all of the outputs, in a way that is rapidly reconfigurable.

IV. Integration of Switch Matrix into Transceiver System

Figure 10:
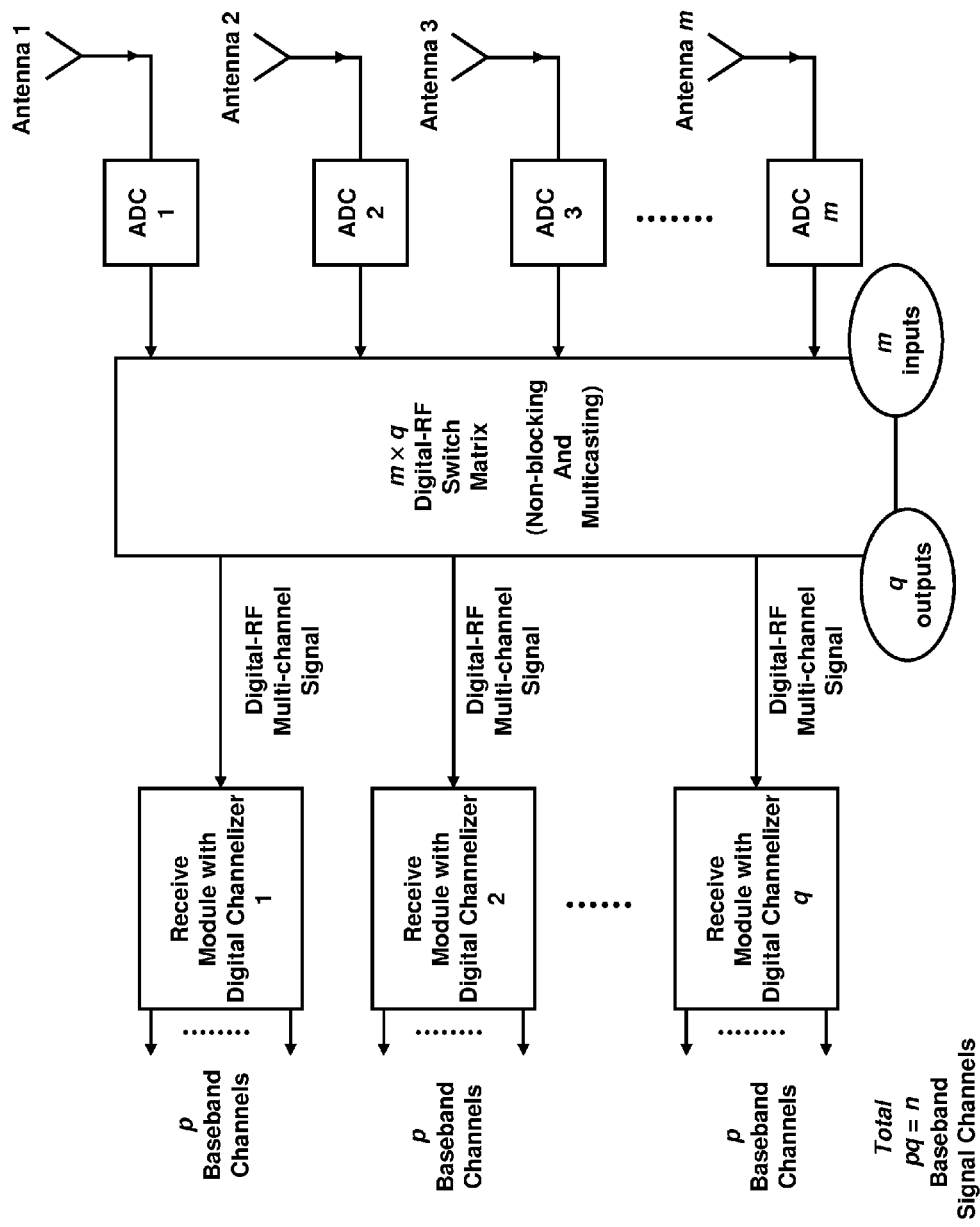
FIG. 10 is a block diagram of a digital-RF switch matrix for receiver systems showing size of the switching array.

To exemplify the advantages of digital routing of RF signals, let us examine the receive side in greater detail (FIG. 10). The analog RF input signals are digitized directly at RF using an ADC behind each antenna. Once the RF signals are in the digital domain, multiple copies can be generated without compromising signal power and quality. Therefore, the digital-RF signal can be simultaneously applied to a bank of digital channelizing units, each operating independently to extract a subband from a wide input band. For a multi-band system, digitized data streams from multiple ADC front-ends can be distributed to a bank of channelizers through a digital non-blocking, multicasting switch matrix. This architecture is scalable to an arbitrary number of channelizers (or more general digital processors) and banded antenna-ADC pairs. Furthermore, the digital switch matrix can be programmed in real time to dynamically reconfigure the communication system: changing band-to-channel allocation, cross-banding, etc.

In general, signal processing involves multiple steps, including multiple levels of channelization. For simplicity, here we have considered only the first level channelization function: extraction of a sub-band through mixing and filtering. This step requires digital-RF processing at clock speeds of 40 Gbps and beyond, and therefore, may be accomplished using superconductor electronics.

One special requirement for the switch matrix is its ability to support multiple input data rates. The ADCs may not share the same clock frequency. For example, the choice of clock frequency may depend on the center frequency of the band for convenient digital in-phase and quadrature (I & Q) mixing, which requires the clock to be 4 times higher or multiples thereof. An asynchronous or better-said multi-synchronous switch, routing both the clock and digitized data together, is essential to address this requirement. This ability to distribute digital signals with several different clock frequencies simultaneously within the same general-purpose switch matrix is a unique feature of one aspect of the technology.

Figure 11:
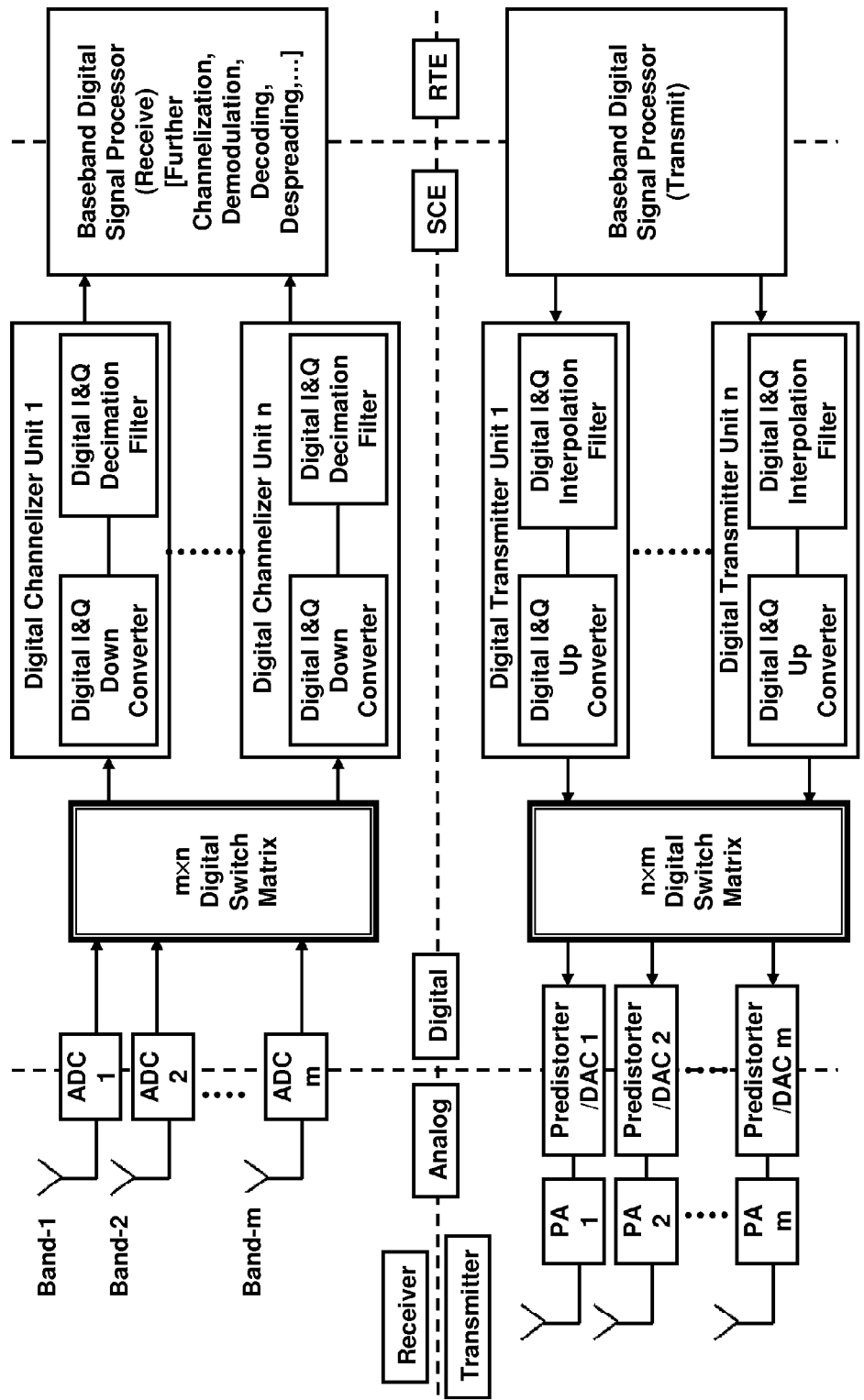
FIG. 11 shows a block diagram of a digital switch matrix included in both receiver and transmitter of a complete digital-RF transceiver system.

A general block diagram of a complete direct digital-RF communication system is shown in FIG. 11. A multi-band RF communication system consists of an antenna subsystem to capture electromagnetic energy in different RF bands and a transceiver subsystem to transmit and receive information from each RF band through a variety of signal processing steps (e.g., up/down-conversion, filtering, modulation/demodulation, coding/decoding, etc.). The goal is to dynamically assign the available signal processing resources to the input bands to meet the communication needs. This requires dynamic RF distribution and routing. The top half of FIG. 11 shows the receive side, where direct digitization of RF signals by analog-to-digital converters (ADCs) is followed by programmable digital routing to a bank of digital processing units. The bottom half shows the reciprocal transmit side. Here, multiple transmit signals are digitally synthesized and connected to digital-to-analog converters (DACs), coupled to digital-RF predistorters that linearize the RF transfer function of high power amplifiers (HPAs) directly.

A similar switch matrix may also be incorporated within a digital-RF transmitter system. In one embodiment, as indicated in the Multicasting Switch Matrix in FIG. 7, it may be desirable to direct more than one digital-RF input to be combined in the same output. Functionally, the multiple inputs may be added in a Combiner circuit, where this must be carried out in the Digital Domain in the digital-RF signals. Let us assume here that the clock frequencies of these signals to be added are the same. That is generally the case for signals designed for transmission using the same output antenna, which are within the same output band. Then the Combiner circuit can be implemented as simply a fast clocked Binary Adder, as has already been demonstrated in RSFQ technology. The outputs of the Binary Adder circuit may be passed along to a multi-bit Digital-to-Analog converter (DAC), the output of which can then be passed to an RF Power Amplifier, and then to a Transmission Antenna.

Figure 12:
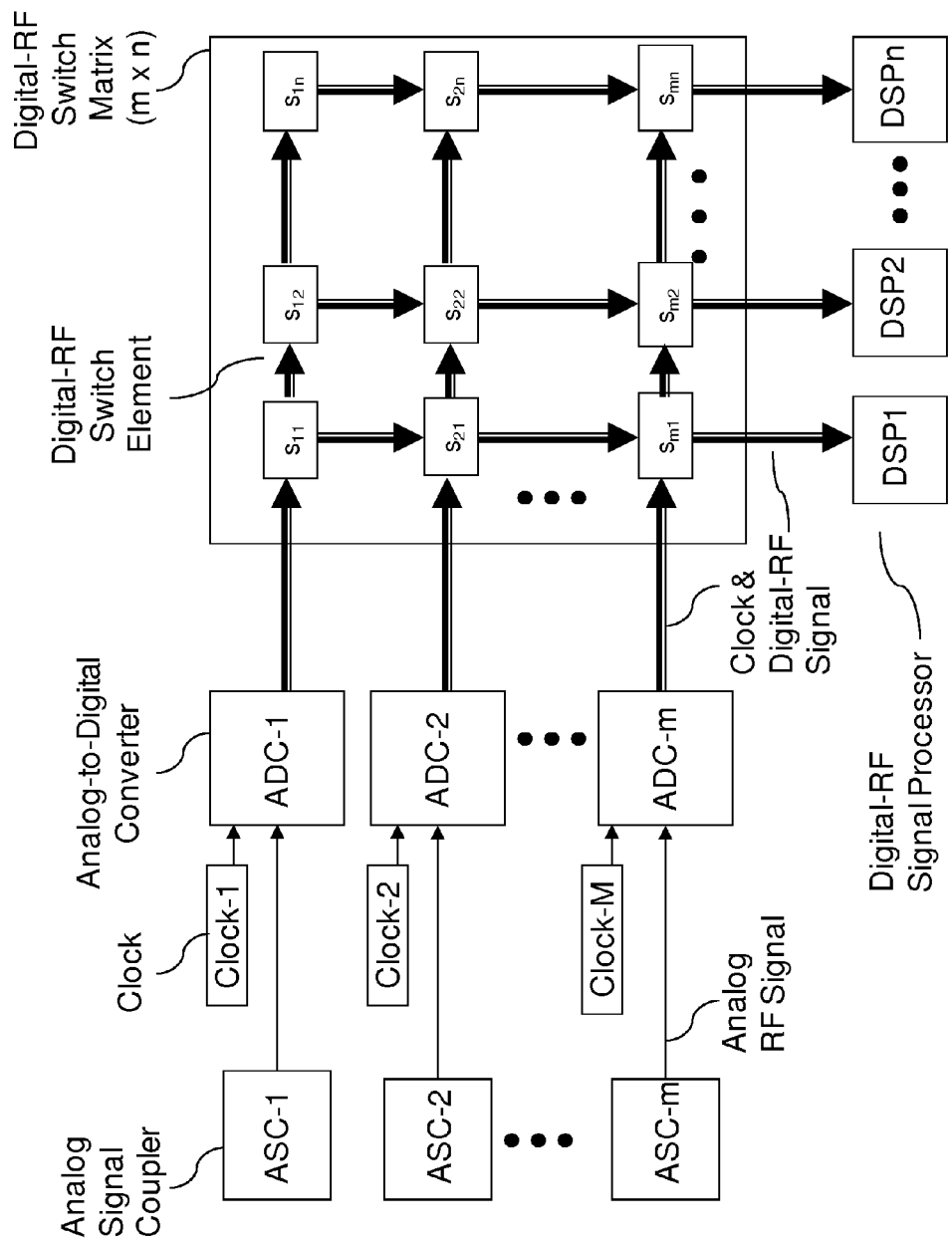
FIG. 12 shows a schematic diagram of a receiver.

FIG. 12 shows a receiver system in which a plurality (m) of analog signal couplers $ASC_1 \ldots ASC_m$ each provide an analog radio frequency signal to a respective analog-to-digital receiver ADC-1 . . . ADC-m, each of which provides an input to a switch matrix, having switch elements $s_{11} \ldots s_{mn}$. A plurality (n) of digital signal processors $DSP_1 \ldots DSP_n$ receive outputs from the switch matrix, and process the received digitized signals. The switch matrix is non-blocking, and, not shown in the figure, multicasting, so the number of digital signal processors may be the same or different than the number of analog-to-digital converters.

Figure 13:
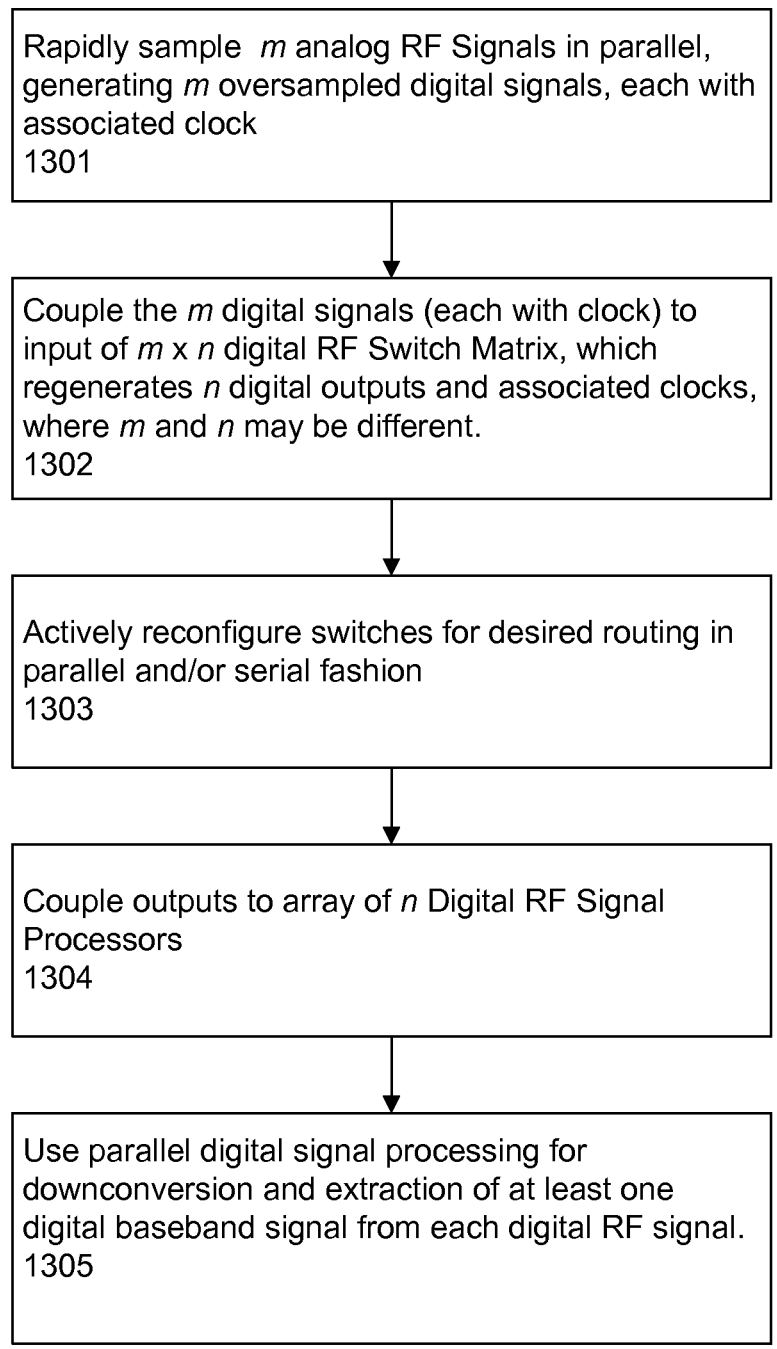
FIG. 13 shows a flowchart for a receiver method.

FIG. 13 shows a flowchart. Initially, m analog RF Signals are rapidly sampled in parallel 1301, generating m oversampled digital signals, each with an associated clock. The m digital signals (each with clock) are coupled to respective inputs of an m×n digital RF Switch Matrix 1302, which regenerates n digital outputs and associated clocks, where m and n may be different. Switches for a desired routing may be actively reconfigured, in parallel and/or serial fashion 1303. Outputs of the switch matrix are then coupled to an array of n Digital RF Signal Processors 1304. Parallel digital signal processing is used for downconversion and extraction of at least one digital baseband signal from each digital RF signal 1305.

While various embodiments of the present invention have been illustrated herein in detail, it should be apparent that modifications and adaptations to those embodiments may occur to those skilled in the art without departing from the scope of the present invention as set forth in the following claims.

What is claimed is:

1. A method for receiving signals, comprising:
concurrently digitizing a plurality of analog radio frequency signals with digitizers, at least one digitizer having a clock rates rate of an associated digital clocks signals clock signal of at least 1 gigahertz; and concurrently receiving and selectively directing a regenerated digitized plurality of analog radio frequency signals and synchronized regenerated respective digital clock signals with a non-blocking multicasting switch matrix;

receiving a switching control signal; and concurrently communicating the plurality of digitized analog radio frequency signals and the respective associated digital clock signals for each respective digitized analog radio frequency signal with the non-blocking multicasting switch matrix to a plurality of digital signal processors in dependence on the switching control signal.

2. The method according to claim 1, wherein the respective digital clock signals for at least two of the respective digitized analog radio frequency signals is independent.

3. The method according to claim 1, wherein the plurality of digitized analog radio frequency signals comprise a digitized modulated radio frequency carrier which is digitized at a clock rate above a respective Nyquist rate for the modulated radio frequency carrier.

4. The method according to claim 1, wherein each of the plurality of digitized analog radio frequency signals has a respective associated digital clock having a clock rate in excess of 1 gigahertz.

5. The method according to claim 1, wherein at least one of the respective digitized analog radio frequency signals comprises a parallel multiple binary bit digital representation of a respective analog radio frequency signal.

6. The method according to claim 1, further comprising matching a delay of a respective digitized analog radio frequency signal and respective associated digital clock signal to maintain synchronization therebetween.

7. The method according to claim 1, further comprising selectively controlling a time delay of a respective digitized analog radio frequency signal in accordance with a control signal.

8. The method according to claim 1, further comprising generating at least two associated digital clock signals having respectively different radio frequencies.

9. The method according to claim 1, further comprising altering the switching control signal to alter an output port of the non-blocking switch matrix for a respective digitized analog radio frequency signal and associated respective digital clock signal dynamically in real time.

10. The method according to claim 1, further comprising processing at least one digitized analog radio frequency signal from the non-blocking multicasting switch matrix with a digital channelizing receiver.

11. The method according to claim 1, further comprising cross correlating a digitized analog radio frequency signal from the non-blocking multicasting switch matrix at a clock rate of the respective associated digital clock signal.

12. The method according to claim 1, wherein the non-blocking multicasting switch matrix comprises a Banyan network.

13. The method according to claim 1, wherein the non-blocking multicasting switch matrix comprises:
a plurality of 2×2 superconducting switch networks, each switch network configured to receive a data signal and an associated data clock signal and to selectively direct a regenerated representation of the received data signal and the associated data clock signal to one of a first output and a second output, controlled in dependence on a set line and a reset line,
the plurality of 2×2 superconducting switch networks being configured as an M×N cross-point switch matrix that connects M inputs to N outputs; and
a plurality of delay compensation networks configured to match delays of regenerated representations of the received data signals and the associated data clock signals at the N outputs.

14. The method according to claim 13, wherein each superconducting switch network comprises at least four switch cells, each switch cell having a non-destructive readout (NDRO) switch, and being configured as a reset-set flip-flop (RSFF).

15. The method according to claim 13, wherein each delay compensation network comprises a tunable Josephson transmission line.

16. The method according to claim 13, wherein a plurality of set lines are connected in series.

17. A method for receiving signals, comprising:
concurrently digitizing a plurality of radio frequency signals to produce a plurality of digitized radio frequency signals, at a digitizer rate of at least 1 gigahertz, each of the plurality of radio frequency signals having an associated independent digital clock signal;
concurrently receiving, regenerating, respectively synchronizing, and selectively directing each of the digitized plurality of radio frequency signals and associated independent clock signal for each respective digitized radio frequency signal, in accordance with a control signal, with a non-blocking multicasting switch matrix, wherein the non-blocking multicasting switch matrix is configured to regenerate and simultaneously multicast the digitized plurality of radio frequency signals and the respective associated digital clock for each respective digitized radio frequency signals as at least two independent output data streams.

18. A method for receiving signals, comprising:
concurrently digitizing a plurality of radio frequency signals to produce a plurality of digitized radio frequency signals, each of the plurality of digitized radio frequency signals having an associated digital clock signal, at least one digital clock signal having a digital clock rate of at least 1 gigahertz;
concurrently receiving the plurality of digitized radio frequency signals and the associated digital clock signals into a multicasting non-blocking switch matrix having a plurality of output ports; and
controlling a respective output port of the multicasting non-blocking switch matrix for a respective digitized radio frequency signal and the respective associated digital clock signal in accordance with a digital control signal, wherein the respective digitized radio frequency signal and the respective associated digital clock signal are regenerated and selectively synchronized dependent on a respective one of the plurality of output ports selected by the digital control signal.

19. The method according to claim 18, wherein the multicasting non-blocking switch matrix comprises:
a plurality of 2×2 switch networks, each switch network configured to receive a data signal and an associated data clock signal and to selectively direct a regenerated representation of the received data signal and the associated data clock signal to one of a first output and a second output, controlled in dependence on a plurality of digital signals, the plurality of 2×2 switch networks being configured as an M×N cross-point switch matrix that connects M inputs to N outputs; and a plurality of delay compensation networks configured to match delays of regenerated representations of the received data signals and the associated data clock signals at the N outputs.

* * * * *